United States Patent [19]

Paciullo

[11] Patent Number: 5,006,379
[45] Date of Patent: Apr. 9, 1991

[54] LITTER BOX LINER

[75] Inventor: Francis P. Paciullo, Middlesex, N.J.

[73] Assignee: Colgate-Palmolive Company, Piscataway, N.J.

[21] Appl. No.: 393,188

[22] Filed: Aug. 14, 1989

[51] Int. Cl.⁵ .................. B65D 25/16; B65D 30/04
[52] U.S. Cl. .................. 428/35.2; 220/403; 383/113; 383/116; 428/198; 428/286
[58] Field of Search ........ 220/403, 404; 383/113, 383/109, 116; 428/35.2, 198, 286

[56] References Cited

U.S. PATENT DOCUMENTS

| | | | |
|---|---|---|---|
| 2,631,630 | 3/1953 | Brady et al. | 383/109 |
| 3,445,055 | 4/1966 | Port et al. | 383/116 |
| 4,101,711 | 7/1978 | Stillman | 428/35.2 |
| 4,658,989 | 4/1987 | Bonerb | 383/109 |
| 4,770,911 | 9/1988 | Sengewald | 428/35.2 |

Primary Examiner—James Seidleck
Attorney, Agent, or Firm—Michael J. McGreal; Robert C. Sullivan; Murray M. Grill

[57] ABSTRACT

A litter box liner comprising a polyethylene bag having on one side a sheet of spun bonded non-woven nylon fibers bonded therto. The bag is pulled over a litter box with the nylon sheet extending upwardly and is pulled off the box by inverting the bag to enclose the animal waste and litter that was disposed in the box. The nylon sheet rendered the liner claw resistant.

6 Claims, 2 Drawing Sheets

LITTER BOX LINER

BACKGROUND OF THE INVENTION

1. Field of the Invention

This invention relates to animal husbandry and, more particularly, to a litter box liner.

2. Description of the Prior Art

Litter boxes are widely used, primarily for cats, but also are used with other pets. These boxes have been made in various sizes of wood, metal, cardboard, plastics or the like. The litter boxes are employed with litter made of sand, sawdust, stone or other granular material and such animal litter is widely available.

One of the disadvantages of using a litter box is that it is often difficult and messy to dispose of the soiled litter and animal excrement and, very often, notwithstanding the use of litter, the litter box must be washed.

The U.S. Pat. No. 4,640,225, to Yananton, employs a liner which is disposed in a litter box and is claw resistant. However, removal of the liner is often difficult, resulting in spillage of the litter and excrement, as well as contamination of the hands of the user.

OBJECTS OF THE INVENTION

The present invention overcomes the disadvantages of the prior art by utilizing a bag, preferably made of polyethylene, in which is disposed the litter box, much as a pillow is inserted within a pillow case. The bag is provided with a sheet of spun bonded non-woven nylon fibers bonded thereto as by adhesive or other bonding procedures, such as heat sealing, sonic welding or the like. The nylon sheet is claw resistant, thus protecting the liners.

It is a further objection of the invention to provide a litter box liner that is simple to use, inexpensive to manufacture and in which soiled materials can be easily stored in a sanitary manner for further disposal.

SUMMARY OF THE INVENTION

The present invention calls for the use of a litter box liner in the form of a bag in which the litter box is inserted. The bag has a side with a sheet of spun bonded non-woven nylon fibers bonded thereto, which is claw resistant and lines the inside of the litter box. Animal litter may be disposed on the nylon sheet. After use, the soiled litter and animal waste is easily and cleanly collected within the bag by inverting the bog and peeling the bag off of the litter box.

DETAILED DESCRIPTION OF THE INVENTION

Figure 1:
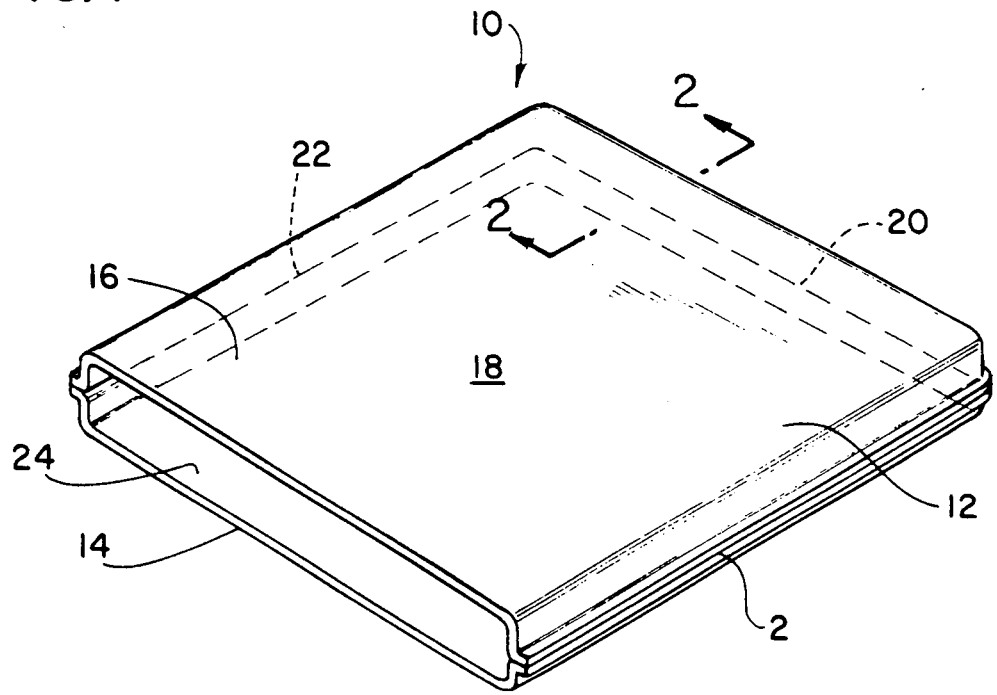
FIG. 1 is a perspective view of a litter box liner according to the present invention.
Figure 2:
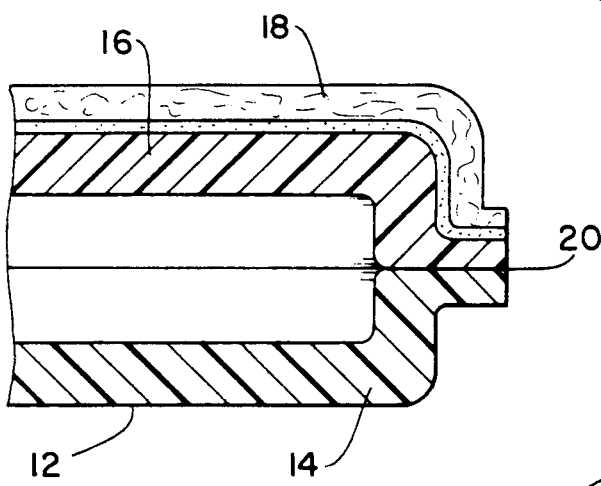
FIG. 2 is a vertical sectional view, taken along the plane of line 2—2 in FIG. 1.
Figure 3:
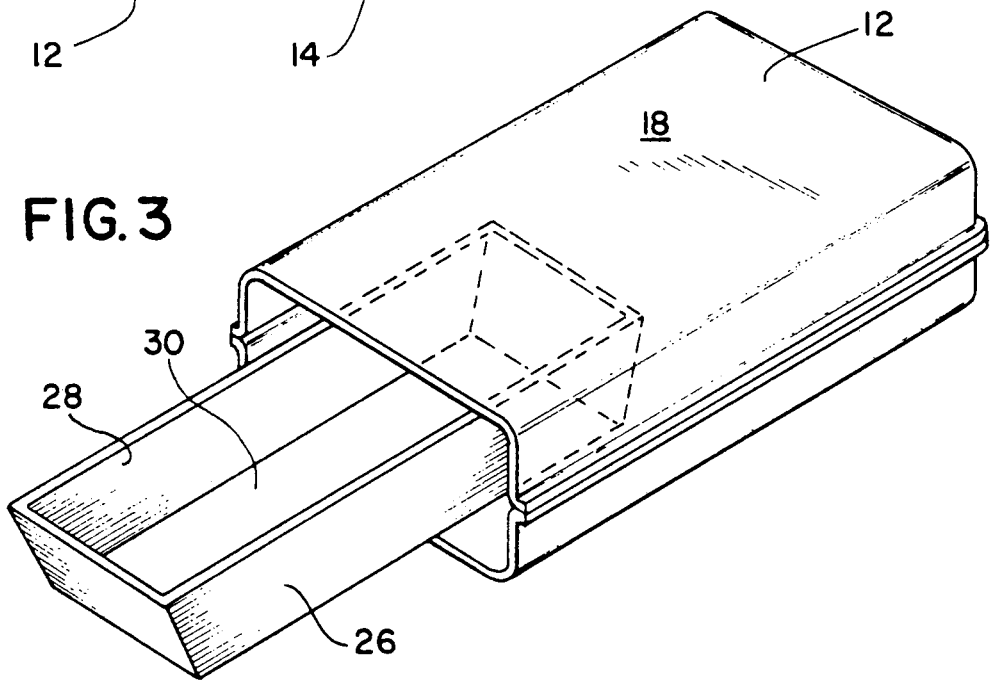
FIG. 3 is a vertical sectional view illustrating the manner in which the litter box liner is utilized with a litter box.

With continuing reference to the accompanying drawings, wherein like reference numerals designate similar parts throughout the various views, reference numeral 10 generally designates the litter box liner constructed in accordance with the concepts of the present invention.

The litter box liner is constructed in the form of a bag 12, preferably formed of polyethylene, which has a lower portion 14 and an upper portion 16. Bonded, preferably by a suitable, adhesive to the upper surface of the upper portion, is a sheet of spun bonded non-woven nylon fibers.

The sheet 18 is Cerex R 1.5 ounce per square yard. The lower portion 14 and the upper portion 16 are bonded together at end edge 20 and side edges 2 and 22 leaving an open mouth 24 at the front.

Figure 4:
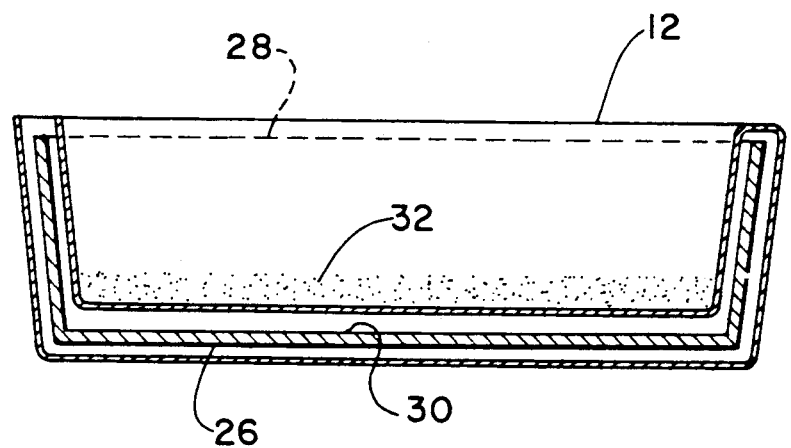
FIG. 4 is a vertical sectional view illustrating the litter box liner ready for use; and, FIG. 5 is a vertical sectional view illustrating how the litter box liner and soiled contents are removed from the litter box.

A litter box 26 formed of wood, metal, plastic, cardboard or paperboard and having rectangular side walls 28 and a bottom 30 is inserted in the open mouth 30 to be completely enveloped by the bag 12, with the sheet 18 being of sufficient size to line the side walls 28 and bottom 30 of the litter box 26 (FIG. 4).

The litter box is then ready to have animal litter of any usable commercially available type, such as sand, sawdust, stone or the like, as indicated at 32 disposed on the sheet 18.

Figure 5:
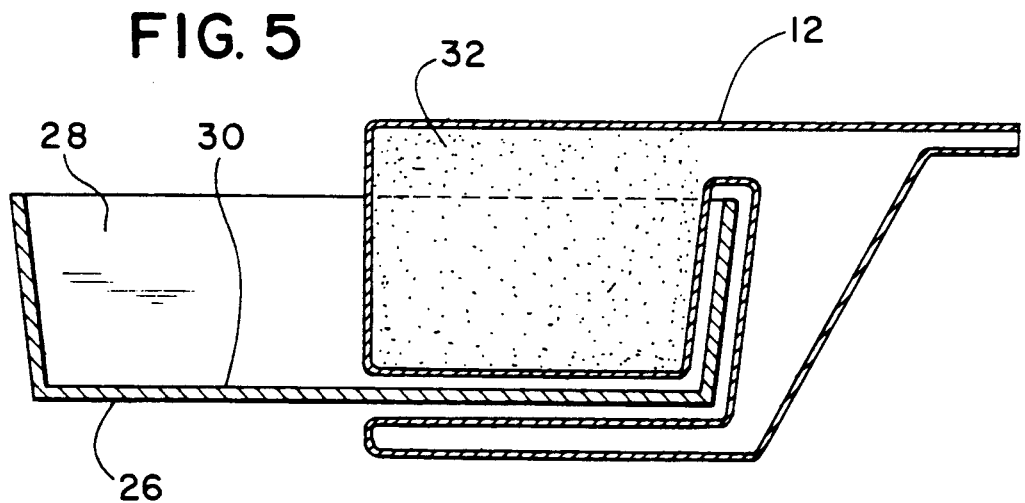

After use, the bag 12 is removed by inverting the lower portion 14 and the upper portion 16, as shown in FIG. 5, so that the entire amount of animal litter and animal waste is disposed within the bag 12 in a sanitary manner ready for convenient disposal.

The litter box 26 has not been soiled in any way since it is fully enclosed in the bag 12 when used and is thus immediately ready to receive another litter box liner 10 installed thereover.

The sheet 18 is preferably bonded to the bag 12 by lines or dots of a pressure-sensitive adhesive.

What is claimed is:

1. In combination with a litter box, a litter box liner comprising a bag having a lower portion and an upper portion, a sheet of claw resistant spun bonded non-woven nylon bonded to said upper portion, said bag having an open mouth for receiving in said bag said litter box.

2. The combination of claim 1, wherein said bag is of polyethylene.

3. A litter box liner comprising a bag having a lower portion and an upper portion, a sheet of claw resistant spun bonded non-woven nylon bonded to said upper portion, said bag having an open mouth for receiving in said bag a litter box.

4. A litter box liner according to claim 3, wherein said bag is formed of polyethylene.

5. A litter box liner according to claim 3, wherein said sheet is bonded to said upper portion by lines of pressure-sensitive adhesive.

6. A litter box liner comprising a bag having a lower portion and an upper portion, a sheet of claw resistant spun bonded non-woven nylon bonded to said upper portion, said bag having an open mouth for receiving in said bag a litter box, said sheet being bonded to said bag by lines of pressure-sensitive adhesive, said bag being of polyethylene.

* * * * *